United States Patent [19] [11] 3,876,931
Godshalk [45] Apr. 8, 1975

[54] METHOD AND APPARATUS FOR DETERMINING BATTERY PERFORMANCE AT ONE TEMPERATURE WHEN BATTERY IS AT ANOTHER TEMPERATURE

[75] Inventor: James B. Godshalk, Yarley, Pa.

[73] Assignee: Fox Products Company, Philadelphia, Pa.

[22] Filed: Dec. 26, 1973

[21] Appl. No.: 428,016

Related U.S. Application Data

[63] Continuation-in-part of Ser. No. 217,760, Jan. 14, 1972, Pat. No. 3,781,658.

[52] U.S. Cl. .............................................. 324/29.5
[51] Int. Cl. .......................................... G01n 27/42
[58] Field of Search ....... 324/29.5; 340/249; 320/48

[56] References Cited
UNITED STATES PATENTS
3,743,931   7/1973   Brodhacker ...................... 324/29.5
3,781,658   12/1973  Godshalk .......................... 324/29.5

Primary Examiner—Robert J. Corcoran
Attorney, Agent, or Firm—Roylance, Abrams, Berdo & Kaul

[57] ABSTRACT

Lead-acid storage batteries of various load ratings are tested with at least service station accuracy by discharging the battery at a known temperature and a single predetermined load, irrespective of the actual load rating of the battery, to provide an electrical quantity representative of the terminal voltage of the battery at that temperature and load, and converting that electrical quantity into an observable indication representing the terminal voltage which the battery would exhibit if discharged at its rated load at a predetermined different temperature. The invention is especially useful for testing automotive batteries and has the advantage of not requiring the capability of matching an actual load to the rating of the particular battery under test.

8 Claims, 15 Drawing Figures

METHOD AND APPARATUS FOR DETERMINING BATTERY PERFORMANCE AT ONE TEMPERATURE WHEN BATTERY IS AT ANOTHER TEMPERATURE

RELATED APPLICATION

This application is a continuation-in-part of my copending application Ser. No. 217,760, filed Jan. 14, 1972, and now U.S. Pat. No. 3,781,658.

BACKGROUND OF THE INVENTION

While numerous methods for testing automotive lead-acid storage batteries have been proposed, the so-called "cranking performance test" based on specifications issued by the Battery Council International (BCI) has been widely adopted in recent years. The cranking performance test is designed to determine whether the battery under test is capable of cranking a particular automotive vehicle engine when at 0°F., and the test is carried out by applying to the fully charged battery an electrical load having characteristics similar to that presented by the starting motor of a vehicle when cranking the engine, and measuring the terminal voltage of the battery under load while the battery is at 0°F. Larger engines require more starting current than small ones, and one practical rule adopted in the field states that the starting current required equals the cubic inch displacement of the engine. The condition of the battery is deemed adequate if the terminal voltage at the end of a 30 second discharge period equals or exceeds 1.2 volts.

While the cranking performance test has distinct advantages, it has heretofore required elaborate and expensive equipment and, even with that equipment, has been practical only for use in battery manufacturing plants, with each test apparatus costing e.g., $1,000–$3,000. While there is an obvious demand for cold battery testers suitable for use in automotive service stations and the like, the fact that a typical service station battery tester sells for, e.g., $75, clearly rules out the cranking performance test in such cases.

A primary reason for the high cost and complexity of prior-art cranking performance test apparatus is the fact that it has heretofore been necessary to cool the battery to, e.g., 0°F. before the test could be carried out, and that requirement has, of course, made this test inapplicable to batteries which are in place in a vehicle.

OBJECTS OF THE INVENTION

A general object of the invention is to devise a test method and apparatus for determining the performance of lead acid storage batteries of a various load rating at a predetermined low voltage, typically 0°F., without requiring that the battery be at that low temperature during the test period, and without requiring discharge of the battery at a particular load selected to match the rating of the particular battery under test.

Another object is to provide automotive service stations, garages, and the like with a relatively inexpensive capability of carrying out the cranking performance test to determine the condition of a battery without requiring that the battery be removed from the vehicle and without providing for a selection of battery discharge rates to deal with the wide range of load ratings arising because of the differences in vehicles presented for service.

SUMMARY OF THE INVENTION

Generally stated, the invention is based on the discovery that differences in performance of a lead-acid storage battery over a practical temperature range, i.e., from −20°F. to 120°F., depend fundamentally on changes in internal resistance of the battery which are caused by the changes in battery temperature, and that these changes can be predicted in a manner which makes it practical to determine the performance of a battery at a predetermined low temperature, e.g., 0°F., when the battery is in fact at any temperature, within a practical range, different from the predetermined low temperature. The invention thus makes it possible to carry out a cold battery test when the battery being tested is actually at ambient temperature. Further, the invention is based on the observation that the nature of the discharge voltage-discharge current plots with different discharge loads is such at all battery temperatures within a practical range that accuracies adequate for service station and like purposes can be attained if the test is carried out by discharging the battery at a single known load and compensating the resulting indication for any difference between the known load and the rated load for the battery being tested.

Application of the invention to carrying out a cranking performance test under automotive service station conditions, where the battery is in a vehicle just driven into the station, is illustrative. Under those circumstances, the aim of the test is to determine whether, if the battery were at 0°F. rather than ambient temperature, it would deliver its rated cranking amperes. In carrying out the test according to the invention, the battery is discharge for a short time at a known rate or load which is the same for all batteries and, depending upon the particular vehicle arriving for test, may or may not be approximately equal to the cranking ampere rating actually required by the engine; the actual temperture of the battery is determined; an electrical quantity is derived from the battery which represents the true terminal voltage of the battery at the end of the short discharge period; this electrical quantity is then converted into an observable indication, with the indication being made to differ from that which would accurately represent the actual terminal voltage both by an amount dependent upon the difference between the actual terminal voltage of the battery at its temperature at the time of the test and the actual terminal voltage which the same battery would exhibit under the same discharge conditions at 0°F., and by an amount dependent upon the difference between the known discharge load and the discharge loads for which the battery is rated, and then comparing the indication so obtained with that which the same battery should provide when discharged at its rated load at 0°F. and good in the sense that it is capable of providing the necessary cranking amperes.

In order that the manner in which the foregoing and other objects are attained in accordance with the invention can be understood in detail, particularly advantageous embodiments thereof will be described with reference to the accompanying drawings, which form a part of this specification, and wherein:

DESCRIPTION OF THE METHOD

The discharge characteristics of any lead-acid type storage battery can be shown as a linear plot of current against voltage with a zero current intercept at about 2.02 volts per cell. The slope of the line depends on the size or capacity of the battery and the charge in the battery. A smaller battery shows a greater slope or drop in voltage with current than a larger one. Similarly, a partially charged battery exhibits a greater voltage drop with current than does a charged one.

The drop in battery voltage with discharge current can be considered as due to the internal resistance of the battery. This resistance depends on the size of the battery, the charge in it, and the temperature. Obviously, all of these factors which affect the resistance must be considered in regard to their effects on the battery discharge characteristics.

Figure 1:
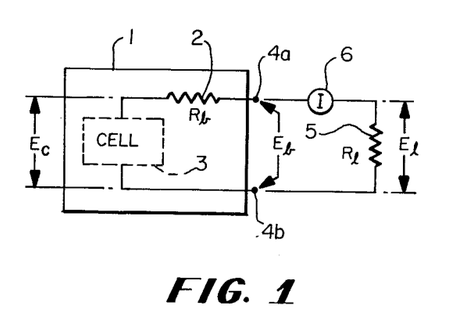
FIG. 1 is an equivalent circuit diagram for a lead-acid storage battery cell under discharge conditions.

The equivalent circuit of a battery cell loaded with a discharge resistor is shown in FIG. 1. In this circuit, the battery 1 presents both an internal resistance 2 schematically indicated as $R_b$ and a cell voltage generator 3. The voltage developed at this cell is labelled $E_c$ and voltage between the terminals 4a and 4b is indicated as $E_b$. The load resistor 5 is labelled $R_1$ and the voltage across the load resistor $E_1$. An ammeter 6 is shown connected in series between the battery and the load resistor. Further details on this equivalent circuit and the theory of operation are provided in Storage Batteries, G. W. Vinal, 4th Edition, John Wiley & Sons, Inc., New York, New York, in Chapters 4 and 7.

Figure 2:
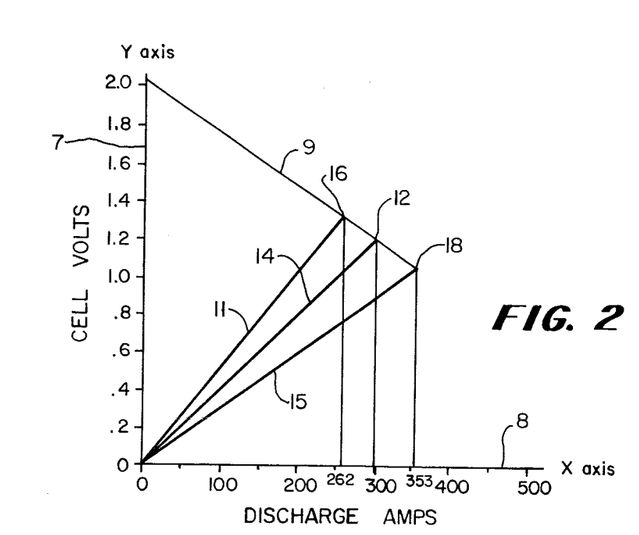
FIG. 2 is a graph illustrating the discharge characteristics of a typical lead-acid storage battery in terms of discharge current versus cell voltage and voltage current characteristics of typical load resistors.

It is convenient to plot the values based on the circuit of FIG. 1 graphically, this type of graph being commonly called a load line. FIG. 2 presents such a graph showing the discharge characteristics of one cell at 0°F. of a typical three or six cell automotive type lead-acid storage battery, the y-axis 7 of the graph being graduated in terms of voltage from 0 to 2.0 volts and the x-axis 8 being graduated in terms of amperage from 0 to 500 amperes. Line 9 represents the average discharge characteristics at 0°F. of cell with a cranking ampere rating of 300. This rating is defined as the discharge current that the cell, or battery, at 0°F. can supply for 30 seconds at a cell voltage of at least 1.20. The load line 14 represents the volt/ampere characteristics of a fixed resistor $R_1$ of 0.004 ohms. When this resistor is connected across the cell shown, the intersection of the load lines at 12 defines the resultant current and voltage. Thus, point 12 indicates that the cell voltage will be 1.20 and the current 300. If this reading is taken on a fully charge cell after 30 seconds of discharge through $R_1$, the cranking ampere rating of the cell is confirmed. For many practical purposes, the 30 second wait time is not important, and a reading after 10–15 seconds is essentially accurate. The wait time should not be too long, 15 too long, however, since continuous application of the load will drain the battery excessively.

Other fixed resistance load lines are also shown in FIG. 2. Thus, lines 11 and 15 are for fixed resistors of 0.003 and 0.005 ohms, respectively. Note that when these resistors are connected to the cell, the load lines intercept at points 16 (1.3 volts, 262 amps) and 18 (1.06 volts and 353 amps), respectively. Thus, FIG. 2 illustrates that only one specific resistor connected to the cell will result in rated cranking current and voltage.

Figure 4:
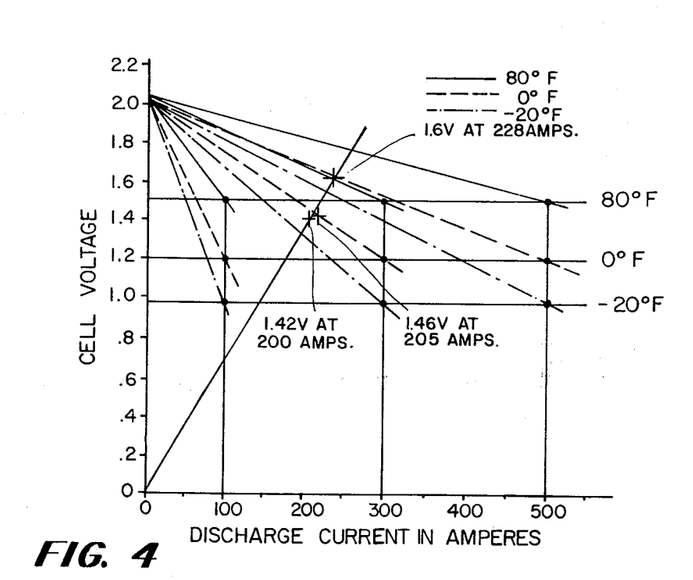
FIG. 4 is a graph showing load lines for three different battery cells each at three different temperatures.

In FIG. 4, volt/ampere load lines are shown for three cells at three different temperatures. By definition of cranking amperes, all cells have the same voltage of 1.20 at 0°F. I have discovered that, when the cells are substantially fully charged and are discharged at the rated cranking amperes, all cells also have essentially the same voltage at all other temperatures within a practical range of, e.g., from −20°F. to 120°F. Thus, at 80°F., all cells, regardless of size, will exhibit a voltage of 1.49, if the cell was fully fully charged and was discharged at its rated cranking amperes. And, at −20°F., all cells will have a voltage of about 0.97. This uniformity is surprising, since it is rare, save for the exception of open circuit voltage, for any characteristic of lead-acid storage batteries to be the same for different sizes of batteries over a range of temperatures.

Further, I have discovered that, insofar as its ability to supply current at any practical voltage is concerned, a battery which is only partially charged will perform as if it were a battery of correspondingly lower cranking ampere rating. Thus, for example, a battery which has a cranking ampere rating of 400 but is only 50% charged will perform as a fully charge battery having a cranking ampere rating of 200. Thus, both a fully charged battery rated at 200 amperes and a half charged battery rated at 400 amperes will provided 1.2 volts per cell at 0°F. and 1.49 volts per cell at 80°F. when discharged at the 200 ampere rate. As an example of a particular case in which the method as thus far described can be practiced to advantage with discharge of the battery at less than its full cranking ampere rating, and without concern as to the state of charge of the battery, consider the case of an automobile having an engine with a cubic inch displacement of 200 but equipped with a battery rated at 400 cranking ampers. Using one "standard" accepted in the trade, the battery should pass the cranking ampere test if, at 0°F., it can supply 200 amperes at a cell voltage of 1.2. Thus, taking 0°F. as the predetermined temperature, 200 amperes can be stated as the cranking amperes required of the battery, and in testing the battery according to the invention, the battery is discharged substantially at 200 amperes, rather than at the full rating of 400 amperes. If the indication provided by the test then corresponds to at least 1.2 volts per cell, the battery is accepted as passing the test.

In view of these discoveries, it is possible to determine the value of the cell voltage of a lead-acid storage battery at one temperature and convert that value into a new value which is that which the battery would exhibit at another temperature. Thus, since all batteries which are capable of delivering the full cranking amperes stated as being required and which have been discharged briefly substantially at the stated cranking amperes will show a cell voltage of 1.49 at 80°F., and similarly a cell voltage of 1.2 at 0°F., the 1.2 volt value which would be exhibited by the battery if tested at 0°F. can be derived from the 80°F. test simply by decreasing the value of 1.49 by 0.29.

When the battery under test is not capable of supplying the stated cranking amperes, conversion of the 80°F. voltage value to the 0°F. value by subtracting 0.29 will not yield a precisely correct value. Thus, in the case of a battery for which the stated cranking current is 300 amperes, but which is deficient to the extent that it supplies only 280 amperes under the test conditions, the voltage obtained at 80°F. will be 1.42, and subtraction of 0.29 from that value yields a value of 1.13 volts, while the battery will in fact provide only 1.10 volts if actually at 0°F. But this error is so small as to be ignored, for practical purposes, and vanishes when the battery is at rating. As will be apparent from FIG. 4, the error occurs because, when the battery is not capable of supplying the full stated cranking amperes, it performs as a battery having a lower rating and the voltage temperature coefficient is therefor correspondingly than that which provides the voltage difference of 0.29 between 0°F. and 80°F. when the battery performs with its full cranking ampere rating.

While the method has been explained with reference to 0°F. as the predetermined temperature, other predetermined temperatures can be used. Thus, when the predetermined temperature is specified as −20°F., and testing is actually carried out with the battery at 80°F., conversion of the actual voltage to that which would be obtained if the battery were at −20°F. can be accomplished by subtracting 0.52 volts per cell from the 80°F. reading. In the foregoing explanation, the phenomena on which the method is based have been purposely simplified by choosing only two temperatures, one of which is the specified low temperature. The temperature effects over the range from −20°F. to 120°F. are known, through this invention, and can be accommodated by the method.

While it is practical to assign linearity, or approximate linearity, to the voltage temperature coefficient, as later explained, this is not the case, as will be apparent from FIG. 3. Here, curve R defines an average of actual voltage values determined by discharging a fully charged battery at its rated cranking amperes for 30 seconds, with the battery actually at the temperature indicated, and measuring the terminal voltage of the battery at the end of the 30 second period, while the battery is still being thus discharged. As will be seen, curve R is essentially parabolic. Since the precise shape and position of the curve is affected by specific construction details of the battery, curve R is accepted as an average or ideal curve and, following the practice in the battery testing field of allowing a maximum error of ±10 percent, particularly in the case of automotive service station testing, similar curves $R_a$ and $R_b$ are provided to define an overall broad area A within which any curve representing the temperature effect on cell voltage which is useful according to the invention will fall.

Over the range from 0°F. to 120°F., curve R is approximated by the equation $$E = 1.2 + (T)^{0.5} 31$$

wherein
 E = cell voltage of the battery under rated load and
 T = the actual temperature of the battery, at the time of testing, in degrees Fahrenheit. This equation yields the curve indicated at S in FIG. 3, which curve can be accepted as a standard over that temperature range. Similarly, over the entire range from −20°F. to 120°F., curve R is approximated by the equation $$E = 0.97 + (T')^{0.5} 19.2$$

wherein E again represents battery cell voltage under rated load and T' is the actual battery temperature, in degrees Fahrenheit, +20°. Equation (2) yields curve U, FIG. 3.

Figure 3:
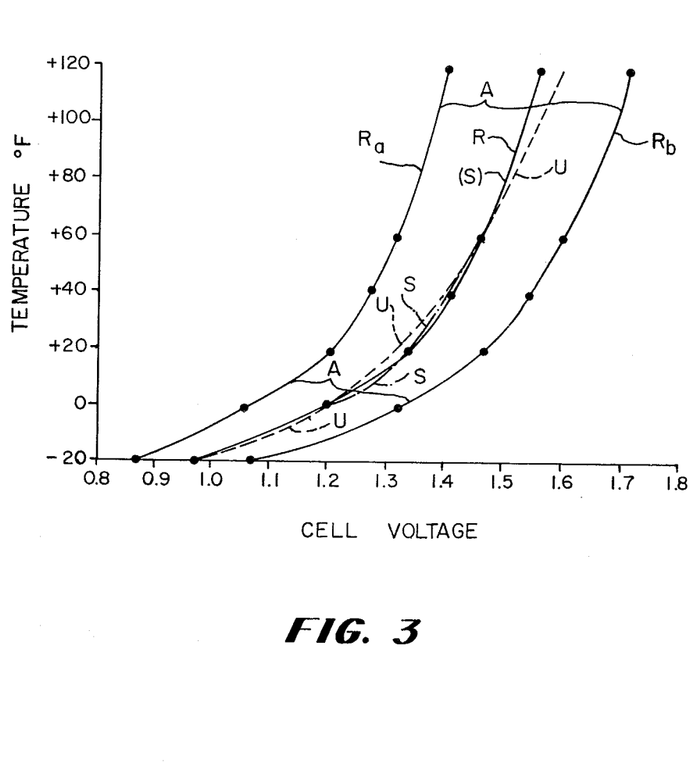
FIG. 3 is a graph illustrating the cell voltage with changing battery temperature for lead-acid storage batteries.

Since all lead-acid storage batteries, regardless of size, exhibit the same voltage at any particular temperature in the practical range of from −20°F. to 120°F. when the voltage is determined while the battery is being discharged at a stated cranking ampere rate, and since the manner in which the voltage changes with changes in temperature is now known from FIG. 3, it is feasible to determine the performance of a lead-acid storage battery at any predetermined temperature by testing the battery when it is at a different temperature. Stated broadly, this is accomplished according to method embodiments of the invention by discharging the battery substantially at a predetermined rate; determining the actual temperature of the battery at the time of testing; deriving from the battery while it is being so discharged an electrical quantity representative of the actual terminal voltage of the battery at the end of the short discharge time period; converting that electrical quantity into an observable indication which differs from that which would accurately indicate the actual terminal voltage by an amount corresponding to the value obtained by determining, from a curve which falls within area A, FIG. 3, and which represents cell voltage versus temperature substantially at rated discharge current, the difference between the voltage values of said curve at the actual temperature of the battery and at the predetermined temperature this difference constituting a first calibration signal; and comparing said indication with that which should be exhibited by the battery, if capable of supplying the stated current, at said predetermined temperature.

When accuracies at least within ±5 percent are required, as when the method is practiced by a battery manufacturer to assure that new batteries actually come up to their cranking ampere rating, the step of discharging the battery is carried out by maintaining the discharge current essentially constant at the cranking ampere rating; the electrical quantity obtained is the acturl terminal voltage; the step of converting that voltage into a meaningful indicication includes algebraically adding to the actual voltage a value determined from curve R, FIG. 3, and then indicating the resulting value as the voltage which the battery under test would actually exhibit at the predetermined temperature; and the step of comparing is accomplished simply by determining if the indication comes up to the value specified for the predetermined temperature. If the predetermined temperature is 0°F., the method is conveniently carried out with the battery at ambient temperatures and thus greater than 0°F., the value to be algebraically added is best derived from curve S, FIG. 3, and thus in accordance with equation (1), and the target value for comparison is then 1.2 volts per cell for automobile batteries.

For automotive service station puposes, the predetermined temperature can be taken as 0°F., the electrical quantity derived from the battery can be the actual terminal voltage, and in converting the terminal voltage into an observable indication, the actual terminal voltage is reduced by an amount $T^p/M$ volts per cell, where T is the actual terminal voltage, $p = 0.5$, and M is a value selected in the range 26–36 to provide a test accuracy, within ±10 percent, for batteries under test at 80°F. With the method thus carried out, the resulting indication is compared with one correspondingly indicating 1.2 volts per cell for automobile batteries.

Figure 3A:
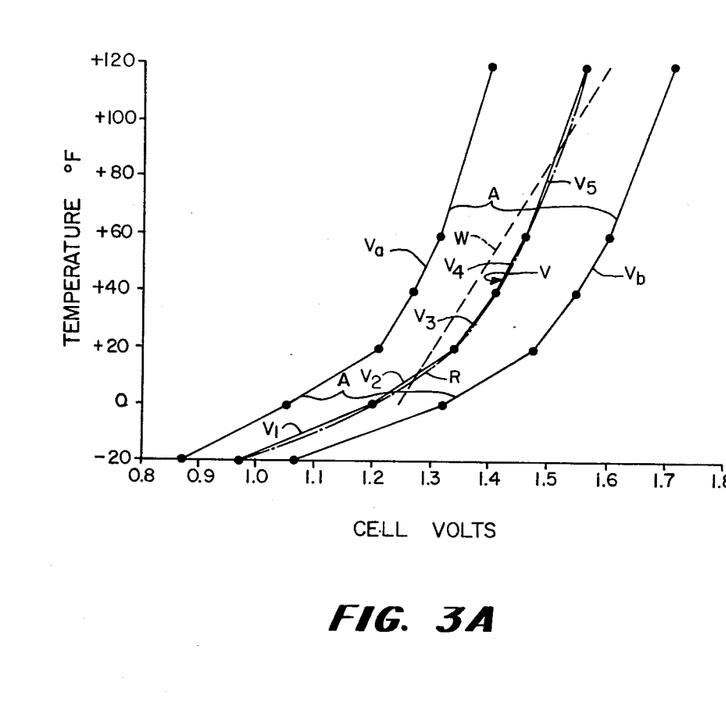
FIG. 3A is a graph, similar to that of FIG. 3, but with curves approximated by one or a series of straight line segments.

In the embodiments of the method described with reference to FIG. 3, modification of the indication into which the derived electrical quantity is converted is accomplished by using a curve, such as curve R or curve S, which falls within the area A, FIG. 3. Accurate matching of such a curve requires, e.g., careful and exact temperature compensation of the test equipment. In some cases, it is advantageous to empoly curves which are made up of straight line segments, as in FIG. 3A, in such fashion as to approximate the actual voltage/temperature curve, since it is sometimes easier and less expensive to provide linear temperature coefficients in the test apparatus. Referring to FIG. 3A, a curve V, closely approximating curve R, is made up of a plurality of straight line segments $V_1$ 14 $V_5$, each approximating a different segment of curve R. Thus, segment $V_1$ commences at the voltage value 0.97 at -20°F. and extends to the intercept of curve R with the 0°F. line; segment $V_2$ commences at that intercept and extends to the intercept of curve R with the 20°F. line; segment $V_3$ extends from that intercept to the intercept of curve R with the 40°F. line; segment $V_4$ extends from that intercept to the intercept of curve R with the 60°F. line; and segment $V_5$ extends from that intercept to the intercept of curve R with the 120°F. line. The straight line segments $V_1$–$V_5$ have slopes of 0.0115, 0.007, 0.0035, 0.0025, and 0.0015, respectively. These straight line segments can be expressed by equations, as follows:

| Segment | Equation |
|---|---|
| $V_1$ | E = .97 + .0115T+20 |
| $V_2$ | E = 1.20 + .007T |
| $V_3$ | E = 1.34 + .0035T−20 |
| $V_4$ | E = 1.41 + .0025T−40 |
| $V_5$ | E = 1.46 + .0015T−60 | where E is the cell voltage and T is the actual battery temperature in degrees Fahrenheit. Since each segment of curve V is a straight line, the temperature coefficients required to match that line are linear and easily provided, for example, by a portion of a tapped temperature compensating resistor.

Coarser approximations of curve R, or of curve S, are acceptable according to the invention, so long as the resulting curve lies wholly within the area A, which is defined by limit curves $V_a$ and $V_b$ which correspond to curves $R_a$ and $R_b$, FIG. 3, respectively, and provide for the allowed ±10 percent accuracy. Thus, for example, curve R can be roughly approximated by the straight line W, FIG. 3A, over the range from 0°F. to 120°F. Line W represents the general equation $$E = A + KT,$$

wherein
E = battery cell voltage,
A = a stated cell voltage value for the battery at 0°F.,
K = the voltage temperature coefficient, and
T = the actual battery temperature in °F. For greatest accuracy, the value of 1.25 volts is assigned to A and K is taken as 0.0029 volts per cell, these values making line W extend as an optimum approximation of the corresponding portion of curve R. For automotive service station purposes, however, the value for A can be selected from the range 1.08–1.32 and that for K can be selected from the range 0.002–0.004 volts per cell per °F.

When the term "short period of time" is employed herein, that term can be defined as a period selected from the range 5–100 seconds, the specific value chosen depending upon the type of battery, e.g., whether an automobile battery, a truck battery, etc., and whether the test is carried out under conditions such that the battery is likely to have a significant surface charge. Considering automobile batteries in use, the short period of time is advantageously in the range of 10–40 seconds, it being assumed that such a battery will have a significant surface charge, and the maximum value of 40 seconds is short enough to keep the battery from being drained excessively by the test. When automobile batteries have not yet been placed in service, presence of a significant surface charge is less likely, and shorter discharge periods can be used.

Referring to FIG. 4, it will be apparent that load lines, such as the load lines 11, 14 and 15 of FIG. 2, can be plotted on the chart of FIG. 4 for various fixed resistors and that, for each battery treated in the chart, the pairs of battery characteristics lines, e.g., the 0°F. and the 80°F. line for each battery, will intersect the various load lines at points spaced apart along the load line by distances depending upon the battery rating, on the one hand, and the particular resistor represented by the load line on the other hand. When the load line is for a load resistor matching the cranking ampere rating of the battery (e.g., $R_1 = 0.004$ ohms for the 300 ampere battery of FIG. 2), the 0°F. line for the battery will intersect the load line at the rated discharge current value and a cell voltage of 1.2 volts, while the 80°F. line will intersect the load line at the rated discharge current value and approximately 1.49 cell volts. If, on the other hand, the load line is for a resistor yielding a discharge rate smaller than the cranking ampere rating of the battery, the 0°F. line for the battery will intersect that load line at a lower ampere value and higher cell voltage value. Thus, for the 300 ampere battery used as the example in FIG. 2, the 0°F. battery line will intersect the load line for a 200 ampere (1.42 volts) at approximately 205 amperes and 1.46 volts, while the 80°F. battery line will intersect that load line at approximately 228 amperes and 1.61 volts. Since the battery lines and load lines are all linear and the 0°F. and 80°F. lines, for example, for each battery diverge at specific angles related to the battery size or rating, I have observed that the voltage or other electrical quantity derived from the battery by discharge through a known load other than the rated load of the battery can be calibrated to yield the corresponding value which would have been obtained if the battery had been discharged through its rated load. Accordingly, the method is completed by applying such a calibration in addition to that described for the difference between actual temperature and predetermined temperature. Typically, such load calibration can be accomplished, when a voltmeter is employed as the indicator, by connecting in series with the voltmeter a calibrating resistor of a value selected according to the voltage difference, if any, resulting from the difference between the current drawn by the known load resistor and the rated load for the battery being tested to produce a calibration signal which is, in the example given above, the difference 1.46 volts less 1.2 volts, both values at 0°F., for a calibrating difference of 0.24 volts.

The accuracy of the test is improved by further compensating the temperature calibration in accordance with the size of the battery being tested. In this regard, referring to FIG. 4, it will be observed that the battery characteristics lines for smaller batteries decline more abruptly from 2.2 volts per cell, and also diverge at greater angles, than do these lines for larger batteries. Therefore, the 0°F. and 80°F. lines, for example, for a battery rated at 100 cranking amperes at 0°F. will intersect any particular load line at points spaced farther apart than are the points at which the same load line will be intersected by the 0°F. and 80°F. lines for a battery rated at 500 cranking amperes at 0°F. This means that a greater temperature compensation is required for smaller batteries than for larger batteries. Thus, when a thermally responsive resistor is employed as the control element in temperature calibration for the method, the desired automatic adjustment can be accomplished by inserting selected resistances in series with the thermally responsive resistor, smaller resistors for smaller batteries and larger resistors for larger batteries.

GENERIC APPARATUS EMBODIMENT

Figure 5:
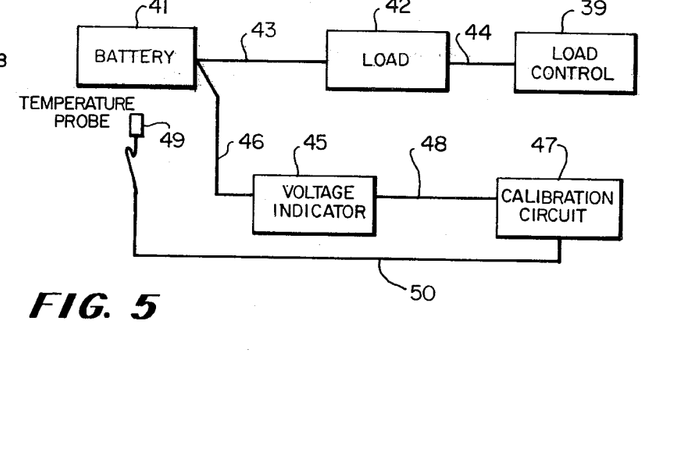
FIG. 5 is a generalized block diagram of cold battery test apparatus according to the invention.

A cold battery test apparatus which capitalizes on the relationships shown in FIG. 3 to carry out the method is shown in the simplified block diagram of FIG. 5. Here a battery 41 is shown connected to a load circuit 42 through multiconductor path 43. Load selection and load control is maintained by use of the load control circuit 39 which is connected to the load 42 by the multi-conductor path 44. The voltage indicator 45 is connected across the terminals of the battery 41 by means of multi-conductor path 46. Meter calibration is accomplished by means of the meter calibration circuit 47 which is connected to the indicator via a multi-conductor path 48. The meter calibration circuit 47 senses the ambient temperature of the battery 41 by means of the temperature probe 49 which is connected to the meter calibration circuit 47 through path 50.

In operation, the apparatus of FIG. 5 is used to establish the performance of a selected battery at a predetermined low temperature, though the battery is actually at ambient temperature, by the steps outlined below.

First, the rating of the battery 41 is determined by examination of the battery or by the requirements of the automotive vehicle in which the battery is to be used. Normally, a rating system is used in which the rating of the battery is equal to the cubic inch displacement (CID) of the engine of the automotive vehicle in which the battery is used. Compensation of the CID rating is made for special load conditions, such as air conditioning equipment.

Second, the load 42 to be applied to the battery in accordance with the CID rating is accomplished by setting the load selector switches of the load control circuits 39. The load circuit 42 can comprise simple fixed resistors, variable manually controlled rheostats such as carbon-pile resistors, or more complex solid state devices. The load control circuits 39 also may employ simple single pole switches or complex switches in solenoid arrangements to select the proper load in terms of CI D current rating or, alternately, it may comprise automatic devices for selecting the proper load in accordance with preprogrammed values of current, voltage, or some other parameter.

Third, the load and voltage indicating equipment are connected to the battery 41 by means of simple battery clips or by means of higher power clamps including those more elaborate clamping devices which include a temperature probe.

Fourth, the voltage indicating device, which may consist of a standard DC meter or more elaborate digital measuring equipment, is set in accordance with the requirements of the battery as to number of cells.

Fifth, the voltage indicator 45 is calibrated to the temperature curve of FIG. 3, or its equivalent mathematical function, by means of the meter calibration circuit 47. The meter calibration circuit can comprise any non-linear element which will respond to the temperature of the battery as measured by the temperature probe 49 and may shunt the meter to form the correct curve in accordance with the requirements of the temperature curve or, alternatively, it can comprise series circuits for calibrating the voltage indicator. In either the series or shunt configuration, the active non-linear element can be a simple thermistor or more complicated servo-driven bridges or simple analog or digital computers which will provide the functions required by the mathematical expression established by the requirements of the curves of FIGS. 3 and 3A.

The meter calibration circuit 47 also compensates for a simulated battery load, i.e., a battery load having a different current rating than the CID rating of the battery. Thus, the voltage indicator 45 displays the performace of the battery under both simulated temperature and simulated load conditions. That is, the display of battery performance by the indicator is calibrated for (a) the simulated battery temperature, the battery performance being shown for one temperature, e.g., 0°F.

when in fact the battery is actually at another temperature, e.g., ambient temperature, and (b) a simulated load, e.g., CID = 400, when in fact the battery actually is discharged through another load, e.g., the load = 200 amperes. By common practice in the industry, a 200 ampere load is defined as that load resistor which, when placed in parallel circuit arrangement with the battery, will cause 200 amperes of current to flow at a terminal voltage of 1.49 volts when the battery is at 80°F.

Figure 6:
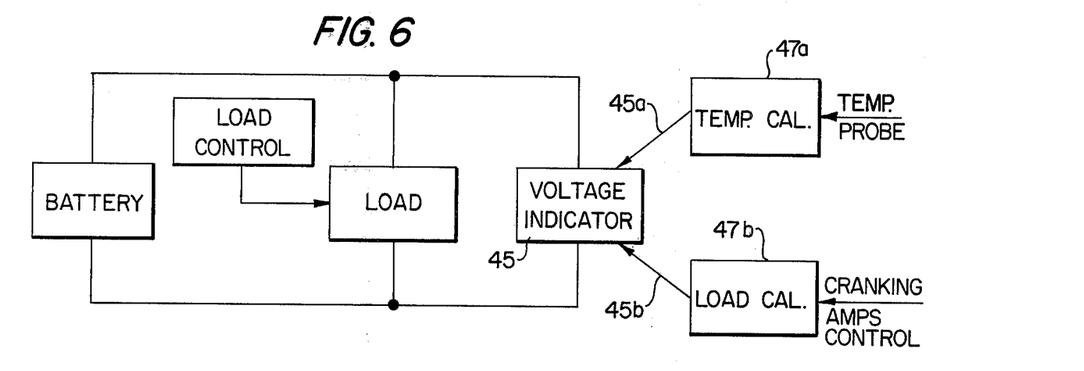
FIG. 6 is a block diagram similar to FIG. 5 but illustrating the dual calibration function.

FIG. 6 is a generalized block diagram of the battery test apparatus showing the relationship of the two calibration circuits to the voltage indicator, other details remaining the same as in FIG. 5. Here, the temperature calibration circuit 47a is connected to the voltage indicator 45 through path 45a and calibrates the voltage indicator so that the performance of the battery is displayed for one simulated temperature when in fact the battery is at a different temperature. Similarly, a load calibration circuit 47b is connected to indicator 45 through path 45b and causes the indicator to display the performance of the battery at a simulated CID load condition, when in fact the battery has a different known load. Temperature calibration circuit 47a responds to the actual temperature of the battery by means of the temperature probe 49 and associated cable 50, FIG. 5. The load calibration circuit 47b can be adjusted for batteries of differing CID ratings by means of the cranking amps control, as described in detail hereinafter.

SPECIFIC APPARATUS EMBODIMENTS

Figure 7:
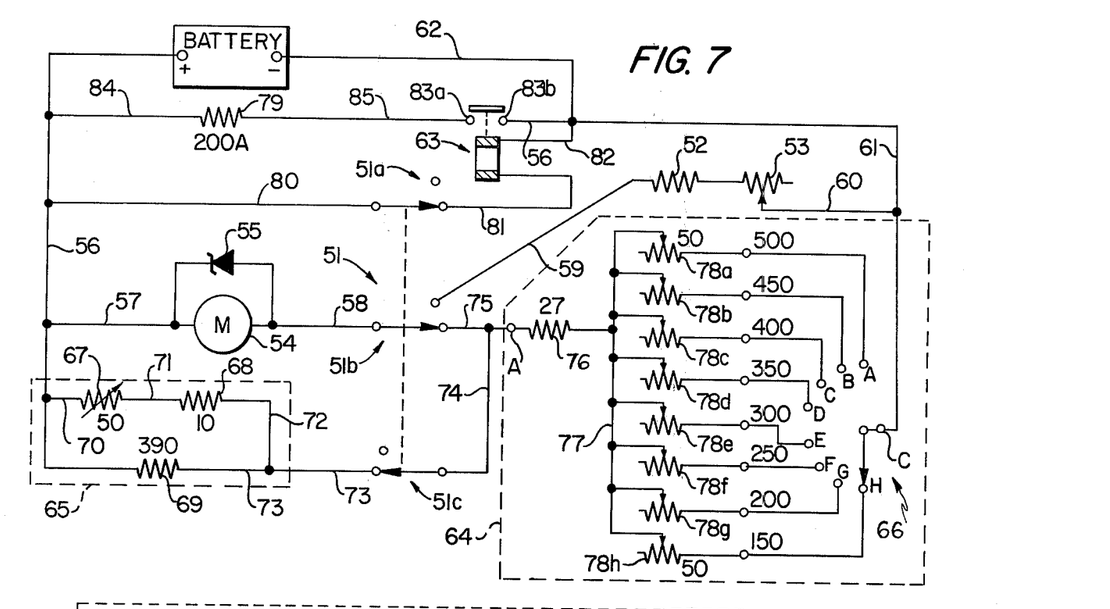
FIG. 7 is a schematic diagram of one advantageous form of the apparatus of FIG. 6.

The basic components of one embodiment of the apparatus, and their interrelation, are illustrated in FIG. 7. The apparatus can be operated in either the load or open circuit mode as determined by the manual setting of a three gang selector switch shown generally at 51 and comprising contact sets 51a–51c.

In the open circuit mode, contacts 51b connect resistor 52 and potentiometer 53 in series circuit relationship with meter 54 and protection diode 55. Thus, when the test apparatus is in the open circuit mode condition, current flows from the positive terminal of the battery through bus 56 and path 57 to meter 54 and via path 58 through contacts 51b, which in the closed position connect through path 59 to fixed resistor 52, voltage calibration potentiometer 53 and finally via path 60–62 to the negative terminal of the battery. Potentiometer 52 calibrates meter 54 to display the terminal voltage of the battery.

With the mode selector switch 51 in the load position, closed contacts 51a energize the load solenoid 63, while closed contacts 51b switch from the voltage calibration circuit to the load calibration circuit indicated generally at 64, and contacts 51c switch in the temperature calibration circuit indicated generally at 65.

Thus, with the mode selector switch 51 in the load position, and with the load calibration selector switch 66 in the 150 ampere position, meter 54 will indicate the performance of the battery as if it were at a temperature of 0° F. with a load of 150 amperes, when in fact the battery is at ambient temperature and the load is 200 amperes. That is, a voltmeter placed directly across the terminals of the battery would indicate its performance at ambient temperature with a load drawing 200 amperes but the temperature calibration circuit 65 which is in shunt circuit arrangement with the meter 54 calibrates the meter to display the battery performance simulated at 0°F. while in fact the battery is at ambient temperature and the load calibration circuit 65, which is in series circuit relation with meter 54, further calibrates the meter to display the performance at a load of 150 amperes while in fact the battery has a 200 ampere load.

The temperature calibration circuit 65 comprises a thermistor 67 in series with a fixed resistor 68, the series combination being in parallel circuit arrangement with a fixed resistor 69. Thermistor 67 is connected via path 70 and bus 56 to the positive terminal of the battery. The other terminal of thermistor 67 is connected via path 71 to one terminal of the fixed resistor 68 and via paths 72 and 73 to fixed resistor 69, the second terminal of fixed resistor 69 being connected to bus 56. The common junction point of the two fixed resistors 68 and 69 is connected via path 73 to one terminal of the mode selector switch section 51c. The shunt path of the temperature calibration circuit 65 is completed via paths 74 and 75 to section 51b of the mode selector switch and finally through path 58 to the negative terminal of meter 54.

Meter 54 and its protective diode 55, in parallel circuit arrangement with the temperature calibration circuit 65, is in series circuit arrangement with the load calibration circuit 64. That is, current flows from the positive terminal of the battery through bus 56, the combination of the meter in parallel with the temperature calibration circuit through sections 51b and 51c of the mode selector switch through the load calibration circuit 64, from terminal A to terminal C, and finally through bus 61 and bus 62 to the negative terminal of the battery.

The load calibration circuit 64 is composed of a fixed resistor 76 connected at one end to terminal A and to bus 77 at the other end. Bus 77 connects the movable terminal of all of eight potentiometers 78a–78h together. Corresponding fixed terminals of all of potentiometers 78a–78h are connected individually to the respective fixed contacts of the 8-position load calibration selector switch 66. The movable contact of selector switch 66, which is shown connected to terminal C of the load calibration circuit 64, is also connected via bus 61 and bus 62 to the negative terminal of the battery.

The battery load circuit includes a 200 ampere fixed resistor 79 and the solenoid 63. With selector switch 51 in the load mode, current flows from the positive terminal of the battery through bus 56 and path 80 to the movable contact of the mode selector switch section 51a. From the fixed contact of section 51a of the mode selector switch, current flows through path 81 to the actuating coil of solenoid 63 and finally through path 82 and bus 62 to the negative terminal of the battery. Thus, with section 51a of the mode selector switch in the load position, solenoid 63 is energized and the circuit including fixed contacts 83a and 83b of solenoid 63 is completed. With solenoid 63 energized, the 200-ampere load 79 is connected across the positive and negative terminals of the battery and current thus flows from the positive terminal through bus 56, path 84, load resistor 79, path 85 through terminals 83a and 83b of the solenoid and finally through path 86 and bus 82 to the negative terminal of the battery.

Operation of the apparatus of FIG. 7 is thus as follows: with switch 51 in the open circuit position, current from the battery flows through meter 54, fixed resistor 52 and calibration potentiometer 53. Meter 54 therefore reads the terminal voltage of the battery and potentiometer 53 is used to calibrate the meter to accurately display the terminal voltage.

With selector switch 51 in the load position, solenoid 63 is energized and resistor 79, chosen to draw 200-amperes from the battery when the terminal voltage is 1.49 volts per cell, is connected across the terminals of the battery. At the same time, sections 51b and 51c of the selector switch place the temperature calibration circuit 65 in parallel circuit arrangement with the meter and place the load calibration circuit 64 in series circuit arrangement with meter 54. Under these conditions, the temperature calibration circuit by-passes some of the current which would otherwise flow through meter 54. With proper values chosen for the components of the temperature calibration circuit 65, the meter will be calibrated to indicate the performance of the battery at 0°F. while in fact the battery is at another, e.g., ambient, temperature sensed by thermistor 67.

Current flowing through meter 54 is limited by the value of the resistors which are contained in the load calibration circuit 64 and which complete the circuit between the negative terminal of the meter and the negative terminal of the battery. Thus, for example, with the load calibration selector switch 66 in position H, current is limited by the potentiometer 78h and the fixed resistor 76. With an actual load of 200 amperes on the battery resulting from resistor 79, meter 54 can be calibrated by proper adjustment of potentiometer 78h so that performance of the battery will be displayed on meter 34 for a simulated load of 150 amperes while in fact the battery has a load of 200 amperes.

Figure 13:
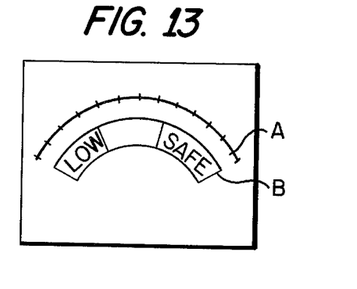
FIGS. 13 and 14 are plan view illustrating typical indicia for the meter employed in the apparatus of FIG. 7.
Figure 14:
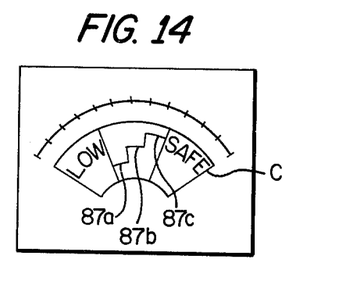

With the test apparatus as shown in FIG. 7, meter 54 has display scales A and B as shown in FIG. 13. Scale A is calibrated to display the terminal voltage of the battery and is for use with a meter of the suppressed zero type. Scale B is divided into a "safe" zone, a "low" zone and an intermediate zone to indicate the performance of the battery at a simulated temperature of 0°F. and a simulated load equal to the CID rating of the vehicle engine as selected by the load calibration selected switch 66. FIG. 14 shows the same meter with a scale C. Scale C has a safe zone, a low zone and three intermediate areas indicating the preferred performance of the battery for vehicles having air conditioning and automatic transmissions. Sector 87a is used for cars with air conditioning and automatic transmissions, sector 87b is used for cars equipped with automatic transmissions only, and sector 87c is used for compact cars and those with standard transmissions.

Figure 8:
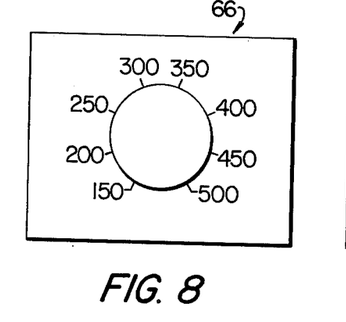
FIG. 8 is a plan view of the operating knob and associated panel indicia for the selector switch employed in the apparatus of FIG. 7.

FIG. 8 shows typical panel indicia for the load calibration switch 66, FIG. 7. Eight different positions are provided in equal steps of 50 amperes to provide for batteries of CID ratings from 150 to 500 amperes.

Figures 10, 12:
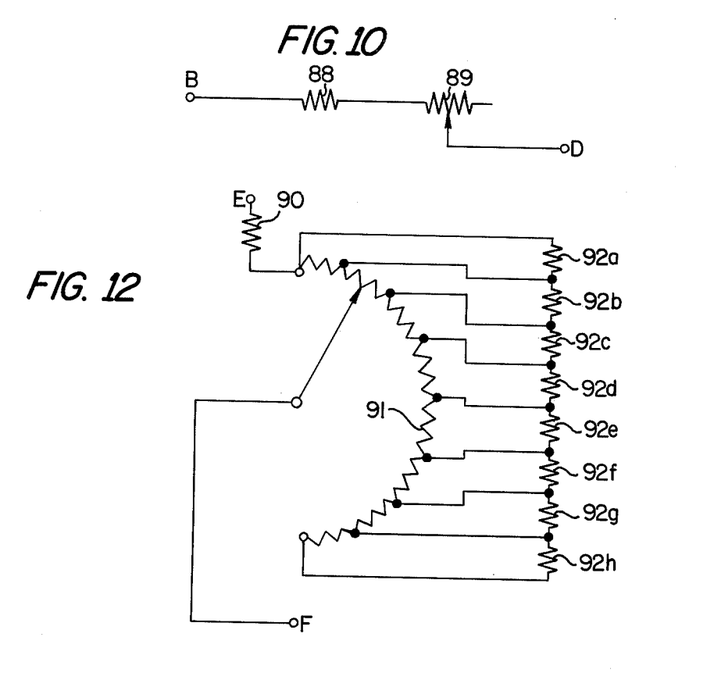
FIG. 10 is a schematic diagram of a portion of the apparatus illustrating still another embodiment.
FIG. 12 is a schematic diagram of a portion of the apparatus of FIG. 7 according to yet another embodiment.
Figure 11:
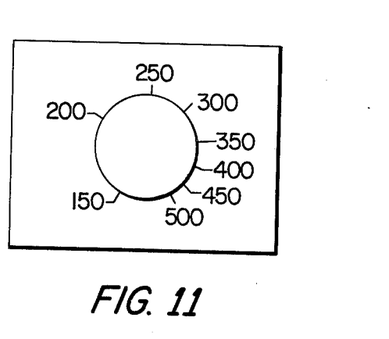
FIG. 11 is a plan view of an operating knob and associated panel indicia for use with the apparatus of FIG. 10.

FIG. 10 illustrates another embodiment of a load calibration circuit useful in the apparatus of FIG. 7 and comprising a fixed resistor 88 and a potentiometer 89 connected in series. This simple circuit can be substituted for the load calibration circuit shown in FIG. 7 by disconnecting fixed resistor 76 from terminal A and disconnecting the selector switch 66 from terminal C. The potentiometer circuit of FIG. 10 is then substituted by connecting terminals B and D, FIG. 10, to terminals A and C of FIG. 7, respectively. In operation, potentiometer 89 is rotated to a predetermined marking on the front panel, for example, 150, at which point the meter will be properly calibrated to show the performance of a battery at a simulated load of 150 amperes. With this circuit, however, the angular rotation of the potentiometer control will be non-linear, that is, the number of degrees of rotation of the shaft of the potentionmeter 89 for each 50-ampere step of CID rating will be different. Thus, the respective markings for the potentiometer knob position will be non-linearly spaced, FIG. 11 illustrating the markings of the front panel to properly calibrate the potentiometer knob with the meter to simulate the CID loads.

FIG. 12 illustrates still a further embodiment that can be substituted for the load calibration circuit 64, FIG. 7. The circuit of FIG. 12 can be substituted for the load calibration circuit 64 by disconnecting fixed resistor 76 from terminal A and the movable contact of switch 66 from terminal C, the circuit of FIG. 12 then being substituted by connecting terminals E and F, FIG. 12, to terminals A and C of FIG. 7, respectively. The load calibration circuit shown in FIG. 12 comprises a fixed resistor 90 in series with a potentiometer 91. The potentiometer 91 has seven taps which, together with the terminal points of the potentiometer, form the connection points for eight fixed resistors 91a–92h. Fixed resistors 92a–92h all have different values, and, when connected in the configuration shown, provide a non-linear resistance value measured between the end points E and F when applied against shaft rotation. With the load calibration circuit of FIG. 12 substituted for the load calibration circuit 64 of FIG. 7, the current through the circuit when plotted as a function of potentiometer shaft rotation will be non-linear. With the proper values chosen for the resistors 92a–92h, the non-linear action of the apparatus of FIG. 7 will be compensated for by the non-linear operation of the potentiometer 91. Under these conditions, the scale markings as shown in FIG. 8 provide proper calibration for the selector switch knob.

Figure 9:
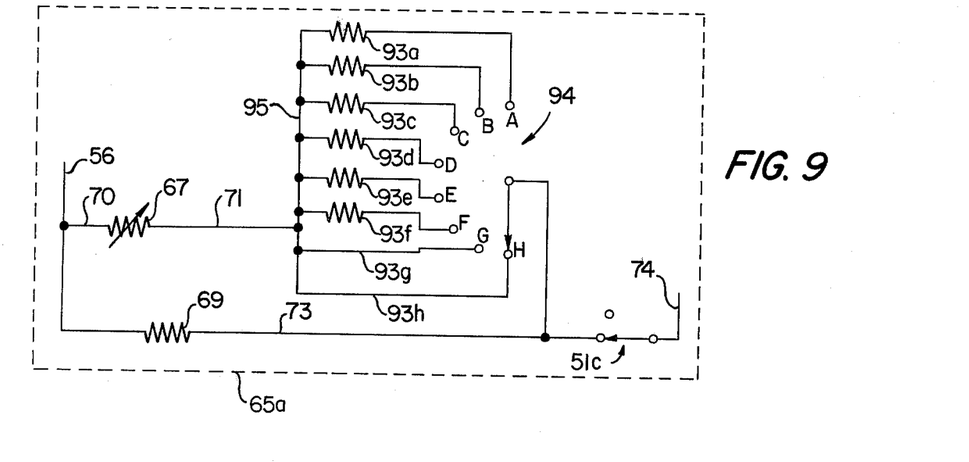
FIG. 9 is a schematic diagram of a portion of the apparatus according to another embodiment of the invention.

Accuracy obtained by the temperature calibrating circuits 65, FIG. 7, can be increased by the embodiment shown in FIG. 9. Here, the fixed resistor 68, FIG. 7, is replaced by a network of eight fixed resistors 93a–93h and an 8-position selector switch 94 arranged to connect any selected one of the resistors 93a–93h in series with thermistor 67, selector switch 94 advantageously being ganged with selector switch 66, FIG. 7, so that manipulation of a single operating member moves the movable contacts of both switches 66, 94 to the same position A–H simultaneously. Thus, for example, when switch 66, FIG. 7, is operated to select resistor 78d, switch 94, FIG. 9, is simultaneously operated to select resistor 93d.

Resistors 93h and 93g are negligible, while resistors 93f–93a, respectively, are of the increasing resistance values. Thus, recognizing that ganged operation of switches 66 and 94 causes resistor 93a to be selected when switch 94 is in its highest cranking ampere setting, it will be noted that resistors 93a–93h of larger value are selected for corresponding higher cranking ampere selections, so that greater temperature compensation, and therefore greater accuracy, are achieved as the size of the battery decreases.

One terminal of each resistor 93a–93h is connected to the corresponding fixed contact of switch 94, the other ends of all of resistors 93a–93h being connected by a common path 95 to path 71.

In all of the embodiments described, it is necessary that the display device be connected to the battery by a temperature calibration circuit which will permit the increase or decrease in the quantity displayed by a magnitude determined at least in part, by the actual temperature of the battery, and that the display device further be connected to the battery by a load calibration circuit which will increase or decrease the quantity displayed by an amount at least partially determined by the simulated CID load.

While particularly advantageous embodiments of the invention have been disclosed for illustrative purposes it will be clear to those skilled in the art that various changes and modifications can be made therein without departing from the scope of the invention as defined in the appended claims. Thus, instead of employing a conventional moving point type of voltmeter as the indicator, other suitable electro-responsive indicators, such as a digital voltmeter or oscilloscope capable of being calibrated, can be used. Similarly, though a load resistor which simulates actual loads has been disclosed, the battery can be discharged through the loaded starting motor of an engine of the rated cubic inch displacement.

What is claimed is:

1. The method for testing a lead-acid storage battery, with accuracies at least adequate for automotive service station battery testing purposes, to provide an observable indication of whether the battery is capable of delivering a stated cranking current at a predetermined temperature when the battery is in fact at a different temperature, comprising
    discharging the battery through a known load resistor at a current different than the stated cranking current for a short period of time;
    deriving from the battery while it is still being so discharged a first electrical quantity representative of the actual terminal voltage of the battery at the end of said period of time;
    sensing the actual temperature of the battery;
    developing a second electrical quantity representative of the difference between said actual temperature and said predetermined temperature;
    developing a third electrical quantity representative of the difference between said stated cranking current and said current obtained by discharging the battery through said known load resistor; and
    converting said first electrical quantity into an observable indication which differs from that which would accurately indicate the terminal voltage of the battery by amounts representative of the algebraic combination of said second and third electrical quantities.

2. In an apparatus for testing a lead-acid storage battery to determine, with accuracies at least adequate for automotive services station battery testing purposes, whether the battery is capable of delivering a stated cranking current at a predetermined temperature when the battery is in fact at a different temperature, the combination of
    discharge circuit means comprising means for discharging the battery for a short period of time at a known rate different from the stated cranking current; and
    test circuit means connectable to the battery and comprising
        means for deriving from the battery a first electrical quantity representative of the actual terminal voltage of the battery while still being discharged at said known rate at the end of said short period of time,
        thermally responsive means for sensing the actual temperature of the battery,
        electro-responsive indicating means connected to said first electrical quantity to provide an observable indication of battery condition, and
        calibrating means connected to said indicating means and comprising first means for modifying the indication displayed by said indicating means in response to said thermally responsive means, and second means for further modifying said indication in accordance with the difference between said known discharge rate and the stated cranking current.

3. The combination defined in claim 2, wherein
said second means of said calibrating means comprises
    adjustable resistance means, and
    manually operable means for selectively adjusting said resistance means in accordance with the cranking ampere rating of the battery to be tested.

4. The combination defined in claim 3, wherein
said adjustable resistance means comprises a plurality of resistors of different resistance values corresponding to known cranking ampere ratings of batteries to be tested; and
said manually operable means comprises a selector switch and cooperating indicia representative of said cranking ampere ratings.

5. The combination defined in claim 3, wherein
said adjustable resistance means comprises
    a potentiometer having a plurality of taps, and
    a plurality of resistors of different resistance values corresponding to known cranking ampere ratings of batteries to be tested, said resistors each being connected between a different pair of said taps;
said manually operable means comprising
    means for adjusting said potentiometer, and
    cooperating indicia representative of said cranking ampere ratings.

6. The combination defined in claim 2, wherein
said indicating means is a voltmeter;
said first means of said calibrating means comprises a thermally responsive resistor connected in parallel with said voltmeter; and
said second means of said calibrating means comprises adjustable resistance means connected in series with said voltmeter.

7. The combination defined in claim 6, wherein
said first means of said calibrating means comprises
    a plurality of resistors, and
    means including a selector switch for connecting selected ones of said resistors in series with said thermally responsive resistor; and
said second means of said calibrating means comprises
    adjustable resistance means, and
    manually operable means for adjusting said adjustable resistance means in accordance with the cranking ampere ratings of batteries to be tested;

said selector switch being ganged with said manually operable means to select resistors of decreasing value as said manually operable means is operated to adjust said adjustable resistance means to values for batteries of lower cranking ampere ratings.

8. In an apparatus for testing lead-acid storage batteries, the combination of temperature responsive means for sensing the temperature of the battery;

first means for deriving from the battery an electrical quantity representative of the terminal voltage of the battery at a known load;

second means for generating a first calibration signal representative of the difference between a predetermined temperature and the temperature sensed by said temperature responsive means;

third means for generating a second calibration signal representative of the difference between a predetermined load and said known load; and fourth means connected to said first, second and third means for combining said first and second calibration signals and modifying said electrical quantity in accordance with the combined signal to generate a simulated indication of the performance of the battery if discharged through said predetermined load at said predetermined temperature.

* * * * *